United States Patent [19]
de Boer et al.

[11] Patent Number: 6,039,172
[45] Date of Patent: *Mar. 21, 2000

[54] DEVICE FOR PROCESSING A DISC-SHAPED SUBSTRATE AS WELL AS A STATION SUITABLE FOR BEING COUPLED TO SUCH A DEVICE

[75] Inventors: Jacob de Boer, SB Waaire; Martin Hamming, AG Eindhoven; Petrus J. M. Goudsmits, BT Waaire, all of Netherlands

[73] Assignee: ODME International B.V., LP Veldhoven, Netherlands

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/833,799
[22] Filed: Apr. 9, 1997

[30] Foreign Application Priority Data

Apr. 12, 1996 [NL] Netherlands ............................ 1002849

[51] Int. Cl.[7] .................................................... B65G 41/00
[52] U.S. Cl. ................ 198/750.1; 234/10 R; 198/860.2; 104/292
[58] Field of Search ..................................... 414/222, 225, 414/749, 751, 222.01; 198/860.2, 750.1; 238/10 R; 104/292

[56] References Cited

U.S. PATENT DOCUMENTS

| | | |
|---|---|---|
| 1,780,118 | 10/1930 | D'Humy ........................... 198/860.2 X |
| 4,515,084 | 5/1985 | Jacoby ............................... 238/10 R X |
| 4,722,298 | 2/1988 | Rubin et al. ......................... 414/222 X |
| 4,850,791 | 7/1989 | Kuriyama et al. ..................... 414/222 |
| 4,925,009 | 5/1990 | Hill .................................. 198/860.2 X |
| 4,995,799 | 2/1991 | Hayashi et al. . |
| 5,002,455 | 3/1991 | Kuriyama et al. . |
| 5,403,397 | 4/1995 | Beckers et al. . |
| 5,411,588 | 5/1995 | Diepens et al. . |
| 5,417,763 | 5/1995 | Diepens . |
| 5,451,155 | 9/1995 | Kok et al. . |
| 5,506,021 | 4/1996 | Bistervels et al. . |
| 5,515,778 | 5/1996 | Boonen et al. . |
| 5,668,733 | 9/1997 | Morimoto et al. .................. 414/222 X |

FOREIGN PATENT DOCUMENTS

| | | |
|---|---|---|
| 594 255 A1 | 4/1994 | European Pat. Off. . |
| 42 17 607 | 2/1994 | Germany . |

*Primary Examiner*—Donald W. Underwood
*Attorney, Agent, or Firm*—Pillsbury Madison & Sutro LLP

[57] ABSTRACT

A device for processing a disc-shaped substrate, which device comprises a plurality of stations arranged in side-by-side relationship, whereby the substrate can be moved into and out of the device in a first station and be subjected to a processing step in a second station, said device furthermore being provided with a transport mechanism for transporting the substrate between the various stations, whereby each station comprises two side walls and an intermediate plate extending between said side walls, which intermediate plate is provided with a guide section extending between the sides of said side walls that face away from each other, whereby stations positioned adjacently to each other are attached together by means of the side walls facing each other and whereby said stations are positioned with respect to each other in such a manner that the intermediate plates and the guide sections are in line, whereby the transport mechanism is capable of movement between the various stations over said guide sections.

8 Claims, 3 Drawing Sheets

DEVICE FOR PROCESSING A DISC-SHAPED SUBSTRATE AS WELL AS A STATION SUITABLE FOR BEING COUPLED TO SUCH A DEVICE

The invention relates to a device for processing a disc-shaped substrate, which device comprises a plurality of stations arranged in side-by-side relationship, whereby the substrate can be moved into and out of the device in a first station and be subjected to a processing step in a second station, said device furthermore being provided with a transport mechanism for transporting the substrate between the various stations.

The invention furthermore relates to a station suitable for being coupled to such a device. The processed substrate is for example a registration carrier, such as a CD, a mould or a master plate for the production of registration carriers.

In a similar device known from European Patent EP-B1-0,594,255 a plurality of stations arranged in side-by-side relationship are accommodated in a common housing. A transport mechanism is capable of movement within said housing over a guide rail extending the entire length of the housing. A drawback of such a device is the fact that the number of stations depends on the size of the housing. The number of stations can only be increased or decreased by replacing the housing and the guide rail. The object of the invention is to provide a device wherein the number of stations of the device can be changed in a simple manner.

This objective is accomplished in the device according to the invention in that each station comprises two side walls and an intermediate plate extending between said side walls, which intermediate plate is provided with a guide section extending between the sides of said side walls that face away from each other, whereby stations positioned adjacently to each other are attached together by means of the side walls facing each other and whereby said stations are positioned with respect to each other in such a manner that the intermediate plates and the guide sections are in line, whereby the transport mechanism is capable of movement between the various stations over said guide sections.

This makes it possible to couple the stations together in a very simple manner and to increase the number of stations as desired. Increasing the number of stations makes it possible to increase the production capacity of the device and/or to increase the number of mutually different processing steps to which the substrate is to be subjected. The user of the device may couple an additional station to the device by connecting a side wall of the additional station to a side wall of the device. The intermediate plates and the guide sections of the device and the additional station will be mutually aligned by suitably positioning the side walls with respect to each other. Following that the substrate can be moved between all stations of the device by means of the transport mechanism.

One embodiment of the device according to the invention is characterized in that said device comprises a measuring device, which makes it possible to determine the position of the transport mechanism on the guide section relative to the first station.

The transport mechanism is preferably controlled from the first station at which the substrate is moved into and out of the device. Since the presence of this station in the device is required at all times, this station forms a good reference for the position of the other stations and for the position of the transport mechanism on the guide section. When an additional station is added the desired position of the substrate in the new station with respect to the first station must be determined once, after which the transport mechanism can be directed to the correct position in the new station from said first station.

The invention will be explained in more detail with reference to a drawing, in which.

Like parts are numbered alike in the various Figures.

Figure 1:
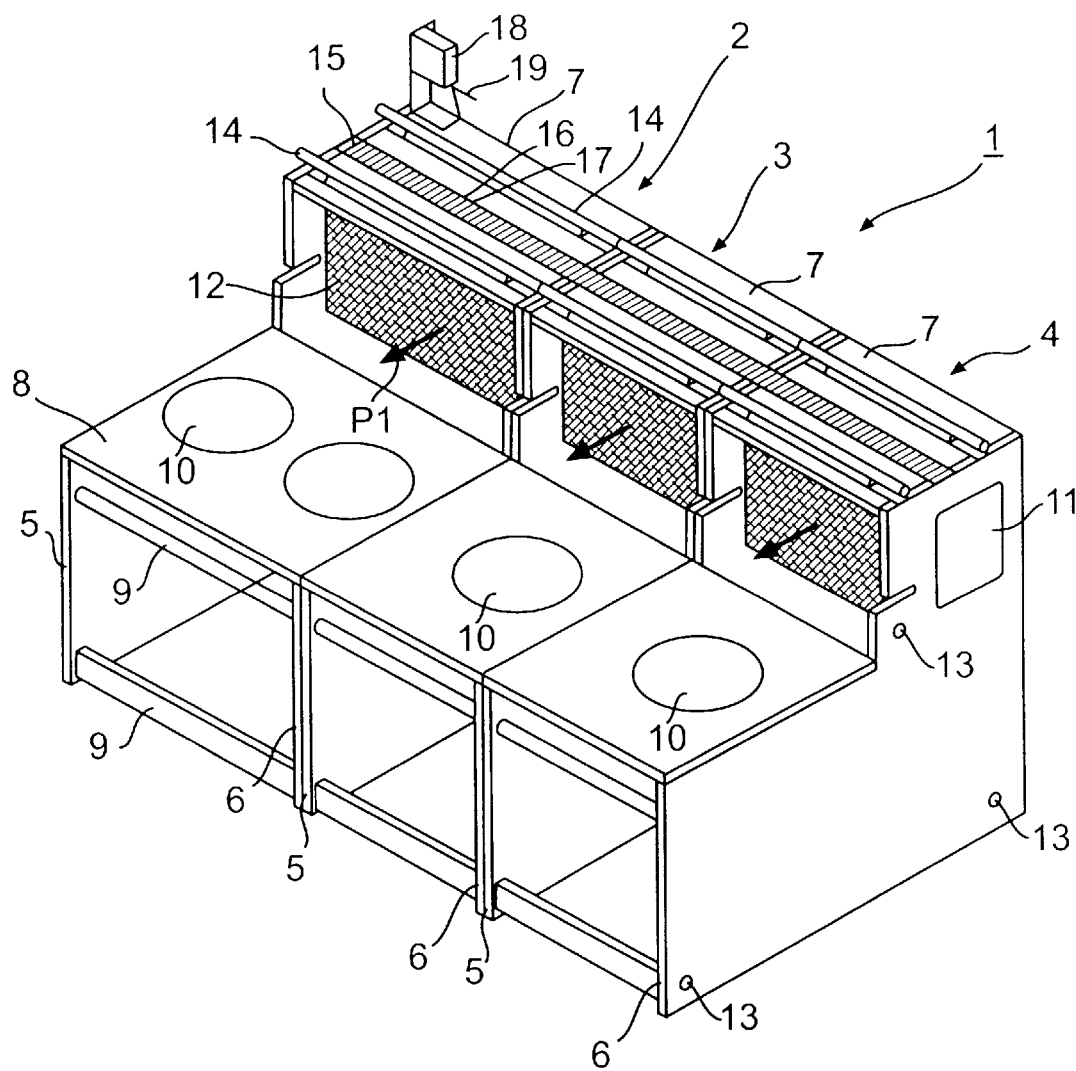
FIG. 1 is a perspective view of a device according to the invention.

FIG. 1 shows a device 1 according to the invention, which comprises three stations 2, 3, 4 arranged in side-by-side relationship. The first station 2 is a loading/unloading station, in which a substrate to be processed is moved into and out of device 1. Station 2 is to this end provided with at least one lock system (not shown) known per se, by means of which a substrate or a buffer with substrates is moved into the conditioned space present within device 1. Second and third stations 3, 4 are processing stations, where the substrate can be subjected to processing steps, such as for example applying a photoresist on the substrate, exposing said photoresist, developing said photoresist, metallising the side of the substrate that carries the developed photoresist, applying a metal film of the metallized layer of the substrate and measuring and analysing the substrate. Devices by means of which the aforesaid processing steps can be carried out are described in great detail in the applicant's European Patent EP-B1-0,594,255 and will not be further explained herein, therefore. Each station 2, 3, 4 comprises a left-hand side wall and a right-hand side wall, which side walls are interconnected by an intermediate plate 7. Side walls 5, 6 are furthermore interconnected by a processing plate 8 extending parallel to intermediate plate 7 and by stiffening rods 9. Processing plate 8 is positioned lower than intermediate plate 7 and functions as a support for the processing equipment present in each station. Numeral 10 schematically indicates the position of the substrate 10 to be processed. Openings 11 being in line are provided in side walls 5, 6, through which openings conditioned air is supplied. The openings 11 are located under intermediate plate 7. An air filter 12 extends under intermediate plate 7, between side walls 5, 6. The air which is supplied through openings 11 flows from the space under intermediate plate 7 through air filters 12 over processing plate 8 in the direction indicated by arrow P1, and is subsequently discharged. Each side wall 5, 6 is provided with three accurately formed fitting holes 13, by means of which a left-hand side wall 5 of one station can be accurately positioned with respect to the right-hand side wall 6 of the adjacent station. Fastening means known per se are fitted through the precisely aligned holes 13 for interconnecting the stations positioned adjacently to each other in a statically determined manner. When two side walls 5, 6 are being coupled together, the intermediate plates 7 of the stations positioned adjacently to each other will automatically be aligned. Each intermediate plate 7 is provided with two parallel rods 14, which extend between the sides of side walls 5, 6 that face away from each other. A magnetic track 15 is positioned between rods 14, which track likewise extends between the sides of side walls 5, 6 that face away from each other. Magnetic track 15 is provided with alternately polarized magnetic surfaces 16, 17. The magnetic surfaces 16, 17 located near side walls 5, 6 are arranged in such a manner that a continuous magnetic track 15 is obtained when the two stations positioned adjacently to each other are coupled together. The ends of the rods 14 are provided with coupling elements, so that the aligned rods 14 of the stations will be mechanically coupled when the two stations positioned adjacently to each other are being coupled together. Said coupling elements may for example comprise a blind recess, which is provided in one end, and a narrowed portion which fits therein, which is provided on the other end. Rods 14 form a guide section for a transport mechanism shown in FIG. 2. The transport mechanism works in concert with the magnetic track 15, as will be explained in more detail with reference to FIGS. 2 and 3. The first station 2 is furthermore provided with a measuring device 18, which comprises a cord 19 which is connected on the one hand to the transport mechanism and on the other hand to a measuring drum provided in measuring device 18. A measuring device of this kind is known for example from German Patent Application DE-A1-42,17,607 and will not be explained in more detail herein, therefore.

Figure 2:
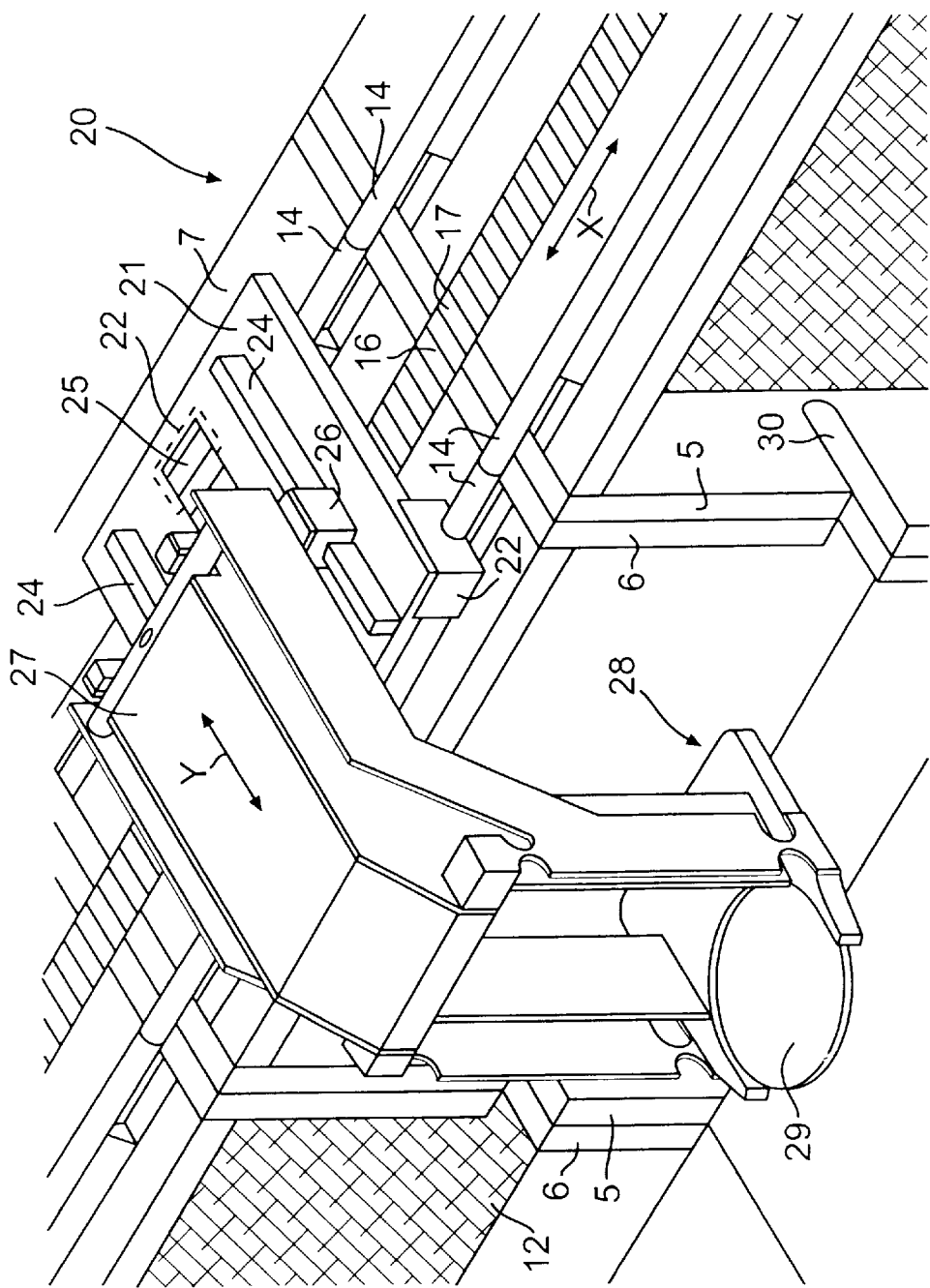
FIG. 2 is a perspective view of a detail of the device shown in FIG. 1.

FIG. 2 shows the transport mechanism 20 which is capable of movement over rods 14 between the various stations 2, 3, 4 lying side by side. Transport mechanism 20 comprises a plate-shaped X-slide 21, which is provided with three ball bushes 22 on a side facing intermediate plate 7, whereby two ball bushes 22 are movable over one rod 14, whilst third ball bush 22 is movable over the other rod 14. The side of X-slide 21 that faces intermediate plate 7 is furthermore provided with an electrically excitable coil 23 (see FIG. 3) which is connected to first station 2 by means of cables (not shown). The length of the cables is such that the device can be extended to maximally 6 or 8 stations, for example, before the cables will be too short to follow the transport mechanism 20 the station located furthest away from the first station. X-slide 21 is provided, on a side facing away from intermediate plate 7, with two guide sections 24 extending transversely to rods 14 and a magnetic track extending between guide sections 24. Two ball bushes 26 are movable in Y-direction over guide sections 24. Said ball bushes 26 are attached to an underside of an Y-slide 27. Y-slide 27 is provided with a gripping mechanism 28, by means of which a substrate 29 can be gripped. The gripping mechanism 28 attached to Y-slide 27 forms the subject matter of another patent application of the present applicant and will not be explained in more detail herein. The Y-slide is provided with an electrically excitable coil (not shown) positioned opposite magnetic track 25, whereby the Y-slide 27 can be moved in Y-direction by exciting said coil. Both coil 23 of X-slide 21 and the coil of Y-slide 27 are controlled from a control unit (not shown) present in station 2, whereby the information from measuring device 18 is used for determining the position and speed in X-direction. A measuring device separately provided on X-slide 21 may be used for determining the position in Y-direction. The substrate can subsequently be moved in X-direction and Y-direction by means of transport mechanism 20. Of course it is possible to provide the Y-slide with a Z-slide, by means of which gripper 28 can be moved in a Z-direction transversely to the Y- and the X-directions. Side walls 5, 6 are provided with a slot 30, through which a plate-shaped part of gripper 28 will slide when the transport mechanism moves in X-direction. The device is thus relatively compact in Y-direction.

Figure 3:
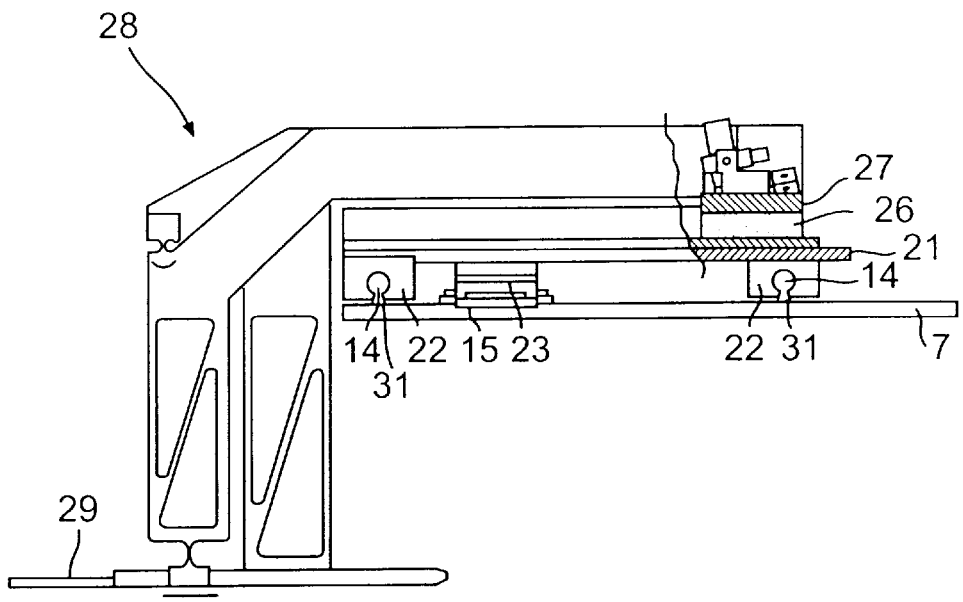
FIG. 3 is a side view of the device shown in FIG. 2.

FIG. 3 is a cross-sectional view of the transport mechanism 20 shown in FIG. 2. As can be seen in FIG. 3, rods 14 are maintained some distance above the intermediate plates 7 by means of distance pieces 31, so that ball bushes 22 can surround rods 14 practically completely. Rods 14 are not supported near the side walls, so that the mutual positioning of the rods can take place in a simple manner.

Figure 4:
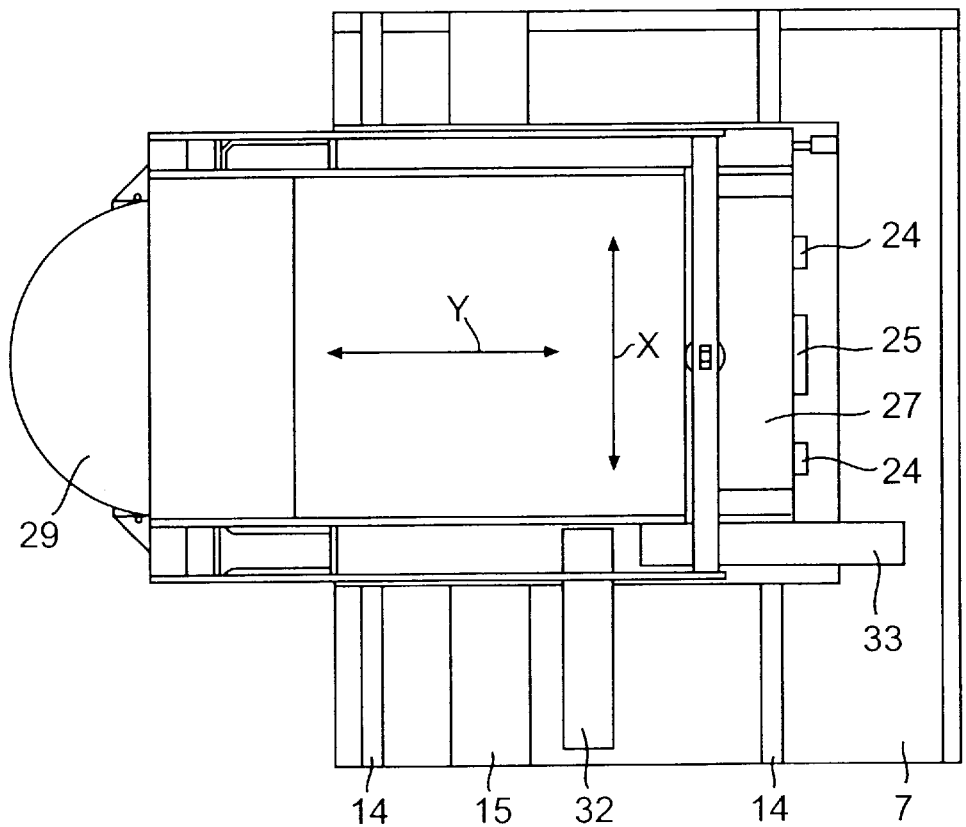
FIG. 4 is a plan view of the device shown in FIG. 2.

FIG. 4 is a plan view of the transport mechanism shown in FIG. 2, which clearly shows coiled cable 32 and the coiled cable 33 which is connected to the coil of the Y-slide.

It is noted that it is also possible to use other measuring devices, such as a laser interferometer, measuring rods and encoders, instead of the measuring device 18 that has been described above.

Instead of using a magnetic track it is furthermore possible to provide a toothed rack on intermediate plates 7, whereby the X-slide will be provided with a pinion engaging said toothed rack. Other alternatives are friction gears, hare transport mechanisms, etc.

We claim:

1. A device for processing a disc-shaped substrate, comprising:
    a plurality of stations arranged in side-by-side relationship, whereby the substrate can be moved into and out of a first one of the plurality of stations and be subjected to a processing step in a second one of the plurality of stations; and
    a transport mechanism that transports the substrate between the plurality of stations;
    wherein each of the plurality of stations comprises two side walls and an intermediate plate that extends between the side walls, the intermediate plate including a guide section that extends between the side walls,
    whereby the stations of the plurality of stations that are positioned adjacently to each other are attached together at the side walls that are adjacent to each other, whereby the plurality of stations are positioned with respect to each other in such a manner that the intermediate plates and the guide sections are in alignment with each other, and whereby the transport mechanism is moveable between the plurality of stations over the guide sections,
    each station further comprising an air supply channel that is located parallel to each intermediate plate and extends between the side walls, wherein the air supply channel of each of adjacent ones of the plurality of stations are in alignment, and
    wherein said air supply channel is located under each said intermediate plate.

2. A device according to claim 1, wherein the device further comprises a measuring device that determines the position of the transport mechanism on the guide section relative to the first one of the plurality of stations.

3. A device according to claim 1, characterized in that each of the guide sections comprises two rods that extend parallel to each other.

4. A device according to claim 1, wherein the transport mechanism includes an X-slide that is movable over the guide sections, and a Y-slide that is moveable in a direction that is transverse to the X-slide.

5. A device according to claim 1, wherein each intermediate plate further includes a magnetic track, each magnetic track comprising alternately polarized surfaces, and extending between the side walls.

6. A device according to claim 4 wherein the X-slide includes an electrically excitable coil that is positioned opposite to a magnetic track.

7. A device according to claim 4, wherein the Y-slide includes a substrate gripping mechanism.

8. The device of claim 1, further comprising an additional station coupled to the at least one of said plurality of stations, said additional station comprising two side walls and an intermediate plate that extends between the side walls, wherein the intermediate plate includes a guide section that extends between the side walls.

* * * * *